(12) United States Patent
Johnston et al.

(10) Patent No.: US 9,172,913 B1
(45) Date of Patent: Oct. 27, 2015

(54) AUTOMATIC COUNTER-SURVEILLANCE DETECTION CAMERA AND SOFTWARE

(75) Inventors: Gregory Edward Johnston, San Jose, CA (US); Larry Hubble, Santa Clara, CA (US)

(73) Assignee: JETprotect Corporation, San Jose, CA (US)

( * ) Notice: Subject to any disclaimer, the term of this patent is extended or adjusted under 35 U.S.C. 154(b) by 341 days.

(21) Appl. No.: 13/236,201

(22) Filed: Sep. 19, 2011

Related U.S. Application Data

(60) Provisional application No. 61/403,978, filed on Sep. 24, 2010.

(51) Int. Cl.
*H04N 7/18* (2006.01)
*H04N 7/15* (2006.01)

(52) U.S. Cl.
CPC ..................................... *H04N 7/155* (2012.12)

(58) Field of Classification Search
None
See application file for complete search history.

(56) References Cited

U.S. PATENT DOCUMENTS

| | | | |
|---|---|---|---|
| D185,996 S | 8/1959 | Knowles | |
| D187,116 S | 1/1960 | Knowles | |
| D188,567 S | 8/1960 | Grosso | |
| D190,690 S | 6/1961 | Smith | |
| D214,533 S | 6/1969 | Anderson | |
| D224,162 S | 7/1972 | Bach | |
| D315,742 S | 3/1991 | Matsumoto | |
| D349,126 S | 7/1994 | Lee | |
| 6,198,528 B1 | 3/2001 | Maynard | |
| 6,433,818 B1 * | 8/2002 | Steinberg et al. | 348/161 |
| 6,578,962 B1 * | 6/2003 | Amir et al. | 351/209 |
| D479,548 S | 9/2003 | Bielefeld | |
| 6,665,063 B2 | 12/2003 | Jamieson et al. | |
| 6,665,079 B1 * | 12/2003 | Tocci et al. | 356/614 |
| D542,684 S | 5/2007 | Nama | |
| 7,274,815 B1 * | 9/2007 | Smithpeter et al. | 382/154 |
| 7,282,695 B2 | 10/2007 | Weber et al. | |
| 7,522,344 B1 * | 4/2009 | Curatu | G02B 27/0093 345/8 |
| D639,983 S | 6/2011 | Quadri | |
| D643,057 S | 8/2011 | Mendoza et al. | |
| D645,892 S | 9/2011 | Nishi | |
| 2002/0013573 A1 * | 1/2002 | Telfair et al. | 606/5 |
| 2003/0142853 A1 * | 7/2003 | Waehner et al. | 382/118 |
| 2004/0032970 A1 * | 2/2004 | Kiraly | 382/103 |
| 2005/0073585 A1 * | 4/2005 | Ettinger | H04N 7/18 348/155 |
| 2006/0044460 A1 * | 3/2006 | Lee et al. | 348/371 |
| 2006/0110008 A1 * | 5/2006 | Vertegaal et al. | 382/103 |
| 2006/0190419 A1 * | 8/2006 | Bunn et al. | 706/2 |
| 2006/0245623 A1 * | 11/2006 | Loiacono et al. | 382/117 |
| 2008/0028325 A1 * | 1/2008 | Ferren et al. | 715/753 |

(Continued)

OTHER PUBLICATIONS

Chase 8—Precision Pan & Tilt Positioner. Copyright 2012. [online] Retrieved on May 16, 2013 from URL: <www.jet-protect.com>.

*Primary Examiner* — Dace Czekaj
*Assistant Examiner* — Mohammad J Rahman
(74) *Attorney, Agent, or Firm* — Haverstock & Owens LLP

(57) ABSTRACT

A counter-surveillance detection system includes a camera with an integrated illumination source and a processor for performing analytic software algorithms. The counter-surveillance detection system and method is configured to detect foreign objects within a defined field of view (FOV) using an analytic software method operating on imagery data from the camera that is synchronized with the illuminator source. In some applications, the system is used to detect a human performing remote observation of snooping.

27 Claims, 13 Drawing Sheets

(56) References Cited

U.S. PATENT DOCUMENTS

| | | | |
|---|---|---|---|
| 2008/0048931 A1* | 2/2008 | Ben-Ari | A42B 3/0433 345/8 |
| 2009/0153662 A1* | 6/2009 | Abel et al. | 348/148 |
| 2010/0290668 A1* | 11/2010 | Friedman et al. | 382/103 |
| 2011/0013007 A1* | 1/2011 | Holmberg et al. | 348/78 |
| 2011/0071675 A1* | 3/2011 | Wells et al. | 700/250 |
| 2012/0051597 A1* | 3/2012 | Fogt | 382/103 |
| 2012/0147038 A1* | 6/2012 | Perez et al. | 345/632 |
| 2012/0154536 A1* | 6/2012 | Stoker et al. | 348/46 |
| 2013/0202196 A1* | 8/2013 | Shirley | 382/154 |
| 2014/0022388 A1* | 1/2014 | Hiebl et al. | 348/144 |

\* cited by examiner

Fig. 14

AUTOMATIC COUNTER-SURVEILLANCE DETECTION CAMERA AND SOFTWARE

PRIORITY CLAIM

This application claims priority under 35 U.S.C. §119(e) of the U.S. Provisional Patent Application Ser. No. 61/403,978, filed Sep. 24, 2010, and titled "AUTOMATIC COUNTER-SURVEILLANCE DETECTION CAMERA AND SOFTWARE," which is hereby incorporated by reference.

FIELD OF THE INVENTION

The invention relates to cameras and object detection using sensing image data from the camera. In particular, the invention relates to an automatic counter-surveillance detection camera and a processing algorithm to selectively identify objects within the sensed imaging data.

BACKGROUND OF THE INVENTION

Cameras and other video equipment are currently used as part of security systems for monitoring the inside of buildings and/or external grounds. The image data from various cameras is typically transmitted to a bank of video monitors in a central viewing area where an operator watches the incoming images for the presence of unauthorized personnel or other events.

Image processing technology continues to be developed. Captured image data can be processed to determine the presence of objects and motion of objects from one frame to another.

SUMMARY OF THE INVENTION

A counter-surveillance detection system includes a camera with an integrated illumination source and a processor for performing analytic software algorithms. In some embodiments, the counter-surveillance detection system and method are configured to detect foreign objects within a defined field of view (FOV) using an analytic software method operating on imagery data from the camera that is synchronized with the illuminator source.

In an aspect, an apparatus includes an illumination source configured to illuminate a field of view; a camera configured to capture a series of image frames corresponding to the field of view, wherein each image frame includes auto-reflected light from within the field of view resulting from illumination by the illumination source; and a means for processing the captured series of image frames to determine if an auto-reflected light is a foreign object in the field of view compared to a known background.

In another aspect, an apparatus includes an illumination source configured to illuminate a field of view; a camera configured to capture a series of image frames corresponding to the field of view, wherein each image frame includes auto-reflected light from within the field of view resulting from illumination by the illumination source; a memory configured to store the series of image frames; and a processor coupled to the memory. The processor includes program instructions configured to: determine a known background, wherein the known background comprises a known value for each pixel in the field of view; determine a difference between a current image frame and the known background thereby forming a difference frame; determine a set of extracted objects from the difference frame; and process each extracted object to determine if the extracted object is a foreign object within the field of view.

The set of extracted objects can include a set of glint objects and a set of kinetic objects. Determining the set of glint objects can include determining pixels from the difference frame that exceed a light intensity threshold, dilating an area surrounding each pixel exceeding the light intensity threshold to include other pixels in the area exceeding the light intensity threshold to form one or more groupings of pixels exceeding the light intensity threshold, and eroding each grouping to remove outlier pixels, whereby each eroded grouping forms a glint object. Processing each extracted object can include processing each glint object by pattern matching each glint object to a known pattern database and assigning a first solution metric to the glint object based on a closeness of the pattern matching, wherein if the first solution metric exceeds a first threshold value then the glint object is determined to be a foreign object. Processing each glint object can also include comparing a location of the glint object to a location of each of the set of kinetic objects and if the location of the glint object matches the location of one of the kinetic object then the glint object is determined to be a foreign object. Processing each glint object can also include comparing a location of the glint object to a location of each of the set of kinetic objects and assigning a second solution metric to the glint object according to the comparison. Processing each glint object can also include comparing the glint object to a persistent object list and assigning a third solution metric to the glint object according to the comparison, wherein the persistent object list comprises a list of extracted objects identified in previous image frames. If the third solution metric exceeds a third solution metric threshold value then the glint object can be determined to be a foreign object. The first solution metric, the second solution metric, and the third solution metric can be individually weighted and summed together to form a cumulative solution metric, wherein if the cumulative solution metric exceeds a cumulative solution metric threshold value then the glint object can be determined to be a foreign object. The set of kinetic objects can include a set of kinetic ON objects corresponding to kinetic objects determined from the image frame captured when the illumination source is ON or a set of kinetic OFF objects corresponding to kinetic objects determined from the image frame when the illumination source is OFF. The program instructions can be further configured to trigger an alarm in response to determining that the extracted object is a foreign object. The illumination source and the camera can be co-aligned. The illumination source can be a laser. The camera can include a filter to selectively capture predefined light wavelengths. The illumination source can be configured to emit light having the predefined wavelengths.

The known background can include a first known background corresponding to when the illumination source is ON and a second known background corresponding to when the illumination source is OFF. Each image frame can be associated with the illumination source ON or OFF, and the set of extracted objects can be determined by determining the difference between the current frame corresponding to the illumination source ON and the first known background, or by determining the difference between the current frame corresponding to the illumination source OFF and the second known background. The apparatus can also include means for adapting an exposure of the camera according to changing time of day and other lighting conditions, thereby normalizing pixels from image frame to image frame. The apparatus can also include means for calibrating one or more known object locations in the known background, each of the one or more known object locations correspond to a known glint object when illuminated by the illumination source, and means for determining an ON/OFF state of the illumination source by determining if the known glint object is present at each of the one or more known object locations when the illumination source is ON. The program instructions can be further configured to detect an observer in the field of view looking in the direction of the camera. The program instructions can be further configured to detect an observer in the field of view looking through an optical device in the direction of the camera.

These and other advantages will become apparent to those of ordinary skill in the art after having read the following detailed description of the embodiments which are illustrated in the various drawings and figures.

BRIEF DESCRIPTION OF THE DRAWINGS

FIG. 10 illustrates an exemplary process performed by the ON Background and the Glint Extraction (GE).

FIG. 11 illustrates an exemplary process performed by the ON Background and the Kinetic Extraction (KE) applied to image data collected when the laser is ON.

FIG. 12 illustrates an exemplary process performed by the OFF Background and the Kinetic Extraction (KE) applied to image data collected when the laser is OFF.

FIG. 14 illustrates a screenshot of an exemplary control GUI.

DETAILED DESCRIPTION OF THE PRESENT INVENTION

Figure 1:
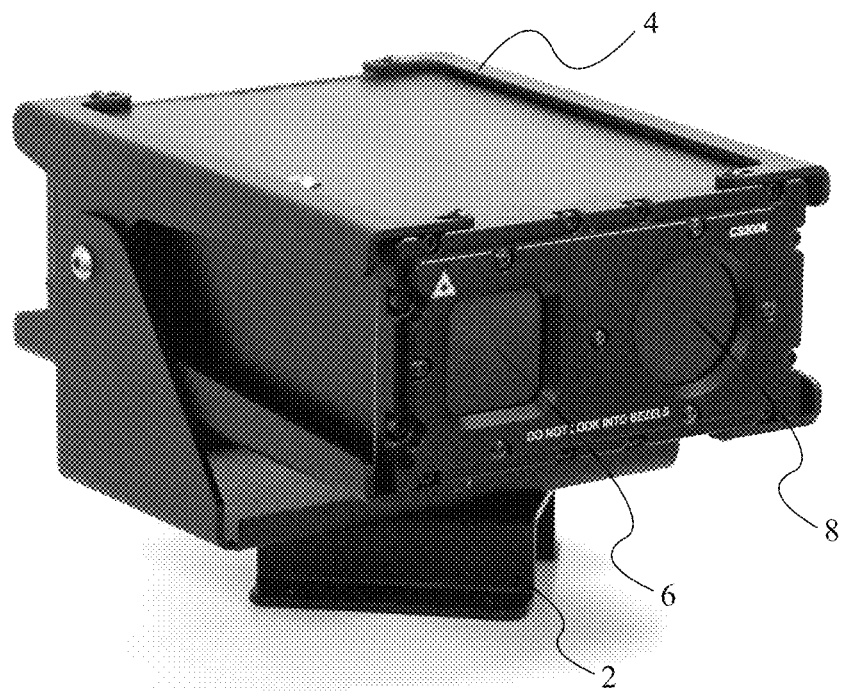
FIG. 1 illustrates a perspective view of a counter-surveillance detection device according to an embodiment.

Embodiments of the present application are directed to a counter-surveillance detection system and method. Those of ordinary skill in the art will realize that the following detailed description of the counter-surveillance detection system and method described herein is illustrative only and is not intended to be in any way limiting. Other embodiments of the counter-surveillance detection system and method will readily suggest themselves to such skilled persons having the benefit of this disclosure.

Reference will now be made in detail to implementations of the counter-surveillance detection system and method as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions will likely be made in order to achieve the developer's specific goals, such as compliance with application and business related constraints, and that these specific goals can vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Some portions of the detailed descriptions which follow are presented in terms of procedures, logic blocks, processing, and other symbolic representations of operations on data bits within a computer system and memory or over a communications network. These descriptions and representations are intended to most effectively describe to those skilled in the data processing arts to convey the substance of the invention. A procedure, logic block, or process is here, and generally, conceived to be a self-consistent sequence of steps or instructions leading to a desired result. The term computing system is used herein as a digital arithmetic integrated circuit comprised of memory, a central processing unit and interface logic. The operation is from algorithms and rules stored in non-volatile memory to measure the sensors, compute a result and take an action. This is often referred to as an embedded system. Although reference to a computing system is used, it is understood that application of the described methods can be similarly applied using any similar electronic device.

Embodiments of a counter-surveillance detection system include a camera with an integrated illumination source and a processor for performing analytic software algorithms. In some embodiments, the counter-surveillance detection system and method are configured to detect foreign objects within a defined field of view (FOV) using an analytic software method operating on imagery data from the camera that is synchronized with the illuminator source. In some embodiments, the camera is positioned immediately adjacent to the illumination source. In other embodiments, a plurality of illumination sources, such as light emitting diodes (LEDs) encircle the camera. In general, the camera and the illumination source or sources are substantially co-aligned, where the term co-aligned refers to proximate positioning of the camera and the illumination source or sources. In other embodiments, additional optics can be used so that the outgoing light path from the illumination source or sources overlaps with the incoming light path of the resulting reflected light.

Imagery is captured both when the illumination source is flashed on and off. Image frames corresponding to when the illumination source is on include auto-reflection resulting from illumination of objects in the FOV by the illumination source. The captured imagery is processed and compared to a known background. In an exemplary application, the counter-surveillance detection system is used to detect an observer in a defined FOV. A principal cue for determining the observer is the auto-reflection from distant human pupils, binoculars and other reflective objects such as optics used to snoop, case or snipe. Auto-reflection refers to sensing light that is reflected from the object at substantially the same angle as impinging light originating from the illumination source. The exemplary application is directed to detecting an observer's eyes or optics positioned in front of an observer's eyes, such as binoculars. In general, the system can be configured to selectively determine light reflected from any object introduced into a known background. A secondary means is achieved from the application of unique classification theory operating on extracted features in the imagery. Secondary means refers to taking the image data captured by the camera and in addition to object detection using auto-reflection, object motion, referred to as kinetic movement, can be used to determine the presence of a person or other foreign object within the known background.

Under the control of a counter-surveillance detection algorithm, the camera generates imagery at a wide range of exposures and includes a co-aligned illumination source, such as an IR laser, under precise on/off control. In some embodiments, the modes of operation for the laser are continuous, strobe, pulse width modulated, or off. In an exemplary application, the strobe mode can vary the fire control of the laser to a resolution of 0.25 ns from 40 microseconds to 4 seconds ON with a range of ON delay from 40 microseconds to 4 seconds.

Combined, these programmable controls provide a detector exposure variation to match the scene's illumination. The laser is co-aligned with the detector array of the camera to make an auto-reflective mode to capture glint, a bright flash of light. The counter-surveillance detection algorithm triggers on the auto-reflection glint cue. As applied to the exemplary application of detecting a person, the person has to be looking normal to the camera to be sensed, so that the reflection of the illumination source off the person's eyes or optics (sniper scope, binoculars, glasses) reflects back to the camera. The intensity of any scattered light is not sufficient to make such a determination. In general, the light wavelength to be detected may vary depending on the observed object. For example, a human pupil reflects light in the near-IR to red wavelength, whereas light reflecting off another camera that has a CMOS sensor may be different than the near-IR to red wavelength. As such, the system can be configured to sense specific wavelengths or groups or wavelengths on an application specific basis. In some embodiments, a filter is applied to only collect light wavelength commensurate to the illumination light wavelength. For example, the camera is configured as a gated-wavelength camera that only collects the same wavelength pulsed by the light illumination source.

The counter-surveillance detection algorithm is configured to subtract out noise, such as extraneous glint, and operate with a low false alarm rate. In an exemplary application, the counter-surveillance detection system and method are configured to detect a 40 mm wide object at 300 m.

FIG. 1 illustrates a perspective view of a counter-surveillance detection device according to an embodiment. The device includes a mounting mechanism 2 coupled to a housing 4. The housing includes an illumination aperture 6 adjacently positioned to a camera aperture 8 such that light, for example IR laser light, output from the illumination aperture 6 is substantially co-aligned with auto-reflected light entering the camera aperture 8.

Figure 2:
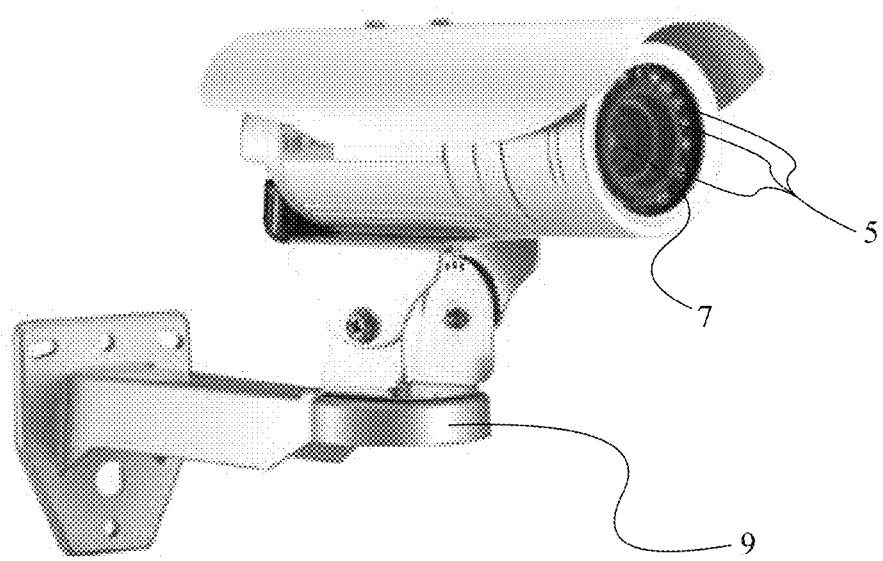
FIG. 2 illustrates a perspective view of a counter-surveillance detection device according to another embodiment.

FIG. 2 illustrates a perspective view of a counter-surveillance detection device according to another embodiment. The device of FIG. 2 is similar to that of FIG. 1 except that a plurality of illumination sources 5 encircle the camera aperture 7. In an exemplary configuration, the device includes a night time illuminator and near-infrared imaging mode. This exemplary device has an LED illumination system that turns on when in the near-infrared mode (Night). The LED illuminators are not under exposure control and hence remain on during night-time operation. The counter-surveillance detection algorithm can still operate but on lesser signal-to-noise means.

In general, the counter-surveillance detection device observes a field of view according to a designed cone angle of the output illumination light. In some embodiments, the device is fixed in position so as to stare at a specific area as defined by the field of view. In some embodiments, the device is a large aperture pulsed laser device configured for both safety and efficiency. At the point the light leaves the camera, the laser's photonic density is low for eye safety. As such, the laser light output at the illumination aperture is expanding resulting in a lower flux density. In some embodiments, an additional light sensor is positioned within the housing bezel, which measures reflected light from proximate objects, such as a person's hand or head. In this manner, the device can be configured to shut down if the additional sensor detects an object within, for example, one meter of the device, thereby providing an added degree of safety.

Figure 3:
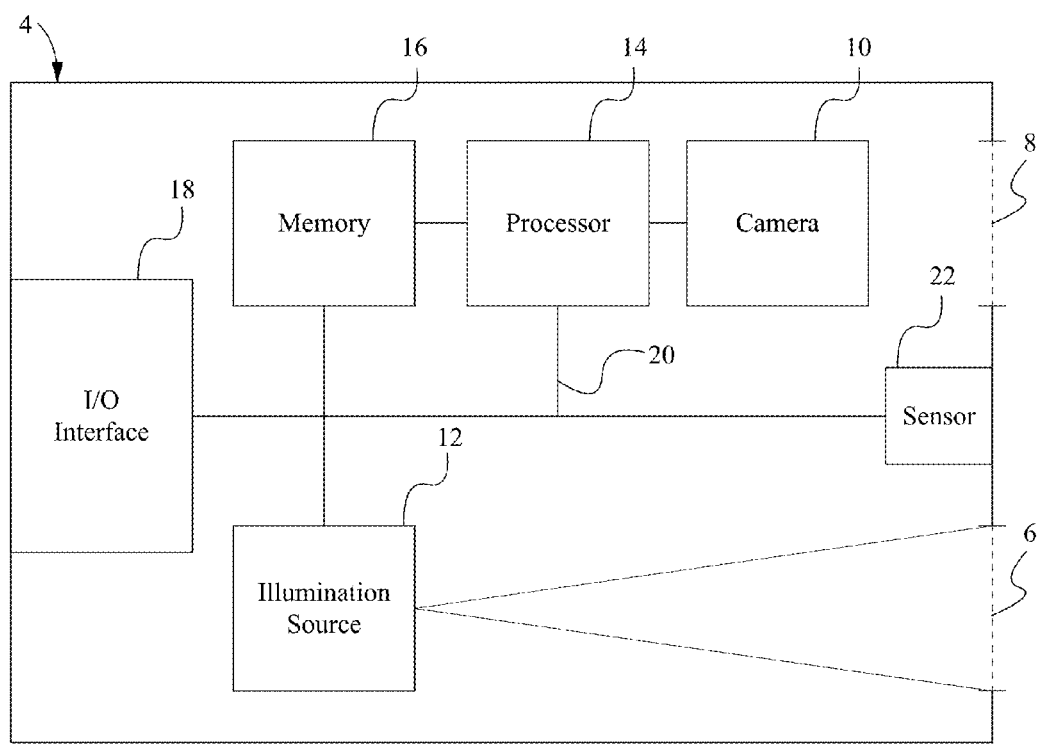
FIG. 3 illustrates a simplified block diagram of the counter-surveillance detection device in FIG. 1 according to an embodiment.

FIG. 3 illustrates a simplified block diagram of the counter-surveillance detection device in FIG. 1 according to an embodiment. The device includes a camera 10 positioned to receive image data including auto-reflection through the camera aperture 8 and an illumination source 12 to output illumination through the illumination aperture 6. The device also includes a memory 16 for storing the counter-surveillance detection algorithm and a processor 14 for performing the counter-surveillance detection algorithm. An optional sensor 22 is positioned within the housing bezel to sense light from proximate objects, which can be subsequently used to shut down the device if an object is determined to be too close to the device. An input/output interface 18 is configured to provide input and output communications to and from the device. The components within the device are selectively coupled using a communication bus 20.

A means to detect distant optics from observers is accomplished by concurrently flashing the illumination source and capturing the camera image. The effect is called an auto-reflection. The illumination source flashes against on-looker optics and they become bright pixels in the image frame. The counter-surveillance detection algorithm stored in the memory and performed by the processor finds distant optics known as 'glint' or 'in-coming surveillance', as described in detail below.

Figure 4:
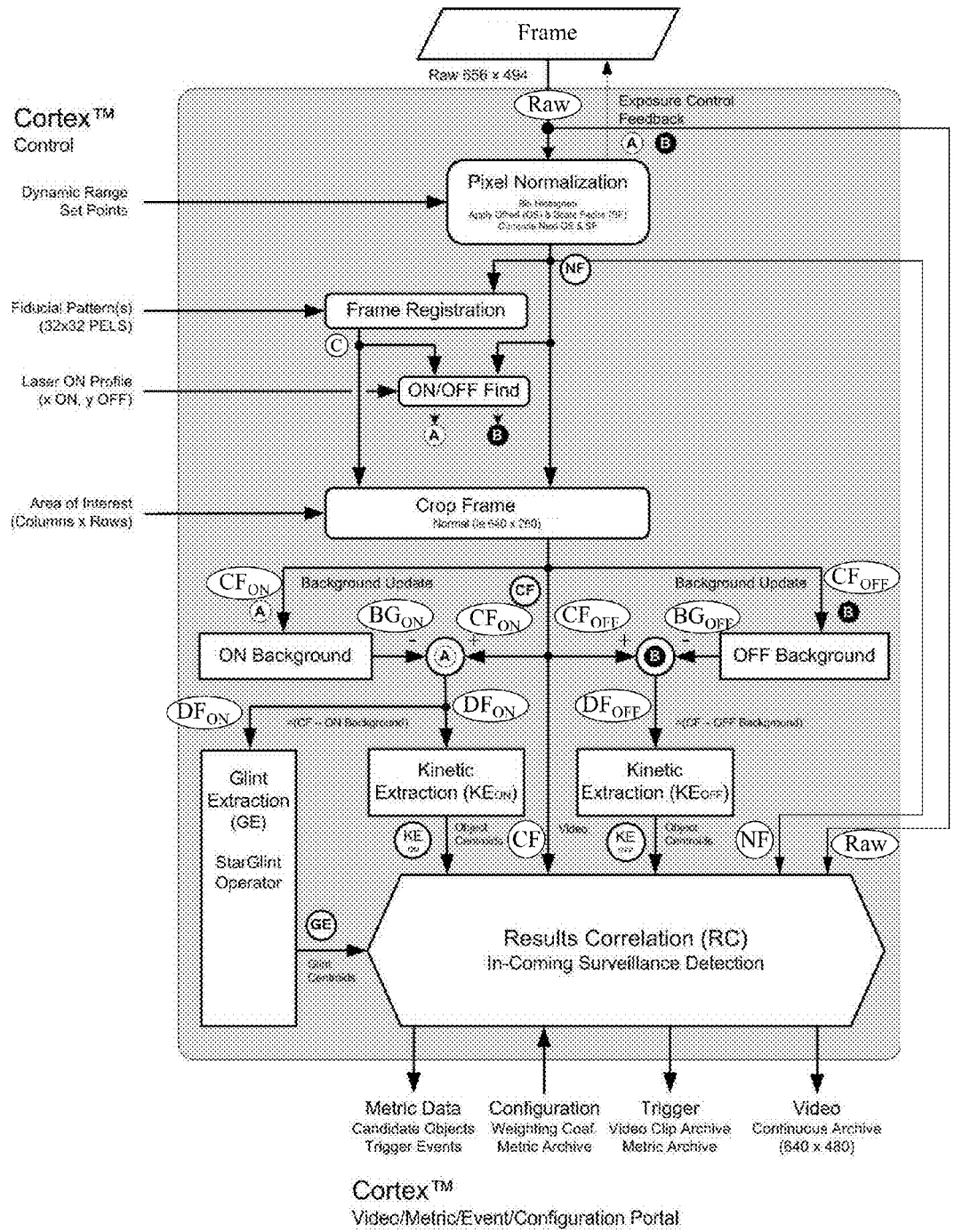
FIG. 4 illustrates the counter-surveillance detection algorithm according to an embodiment.

Image data collected by the camera is processed by the counter-surveillance detection algorithm to detect an observer or other object. An affirmative detection is considered a triggering event. FIG. 4 illustrates the counter-surveillance detection algorithm according to an embodiment. The counter-surveillance detection algorithm is described below in terms of a laser illumination source. It is understood that the algorithm can be used with other types of illumination sources. Image data is provided from the camera and framed. In some embodiments, the image data is framed as a monochromatic 656×494 array with each pixel having a 10 bit intensity depth. All pixels are exposed at the same time. Timing controls are applied to the camera and illumination source to perform photonic measurements with the detector array.

Each frame is processed by multiple algorithm sets. The first set of processes is referred to as Pixel Normalization which builds two statistics from the RAW frame provided by the camera to determine the overall dynamic range of the pixels. The Pixel Normalization is a means for controlling the exposure so that the counter-surveillance algorithm is always evaluating the field of view with the same exposure. One method for determining object movement in the field of view is to determine if a pixel intensity changes. Pixel Normalization maintains an overall exposure from frame to frame. An objective is to maximize the range of intensity values and normalize it for frame to frame exposure consistency. The intensity space of the pixel values are adjusted by adding an offset (OS) and scaling factor (SF). The values for offset and scaling factor can either be set manually from user constants or adjusted automatically by an 'O&S Background' algorithm using the statistics found in this set and applied to the next. The output of the Pixel Normalization is a Normalized Frame (NF).

Figure 5:
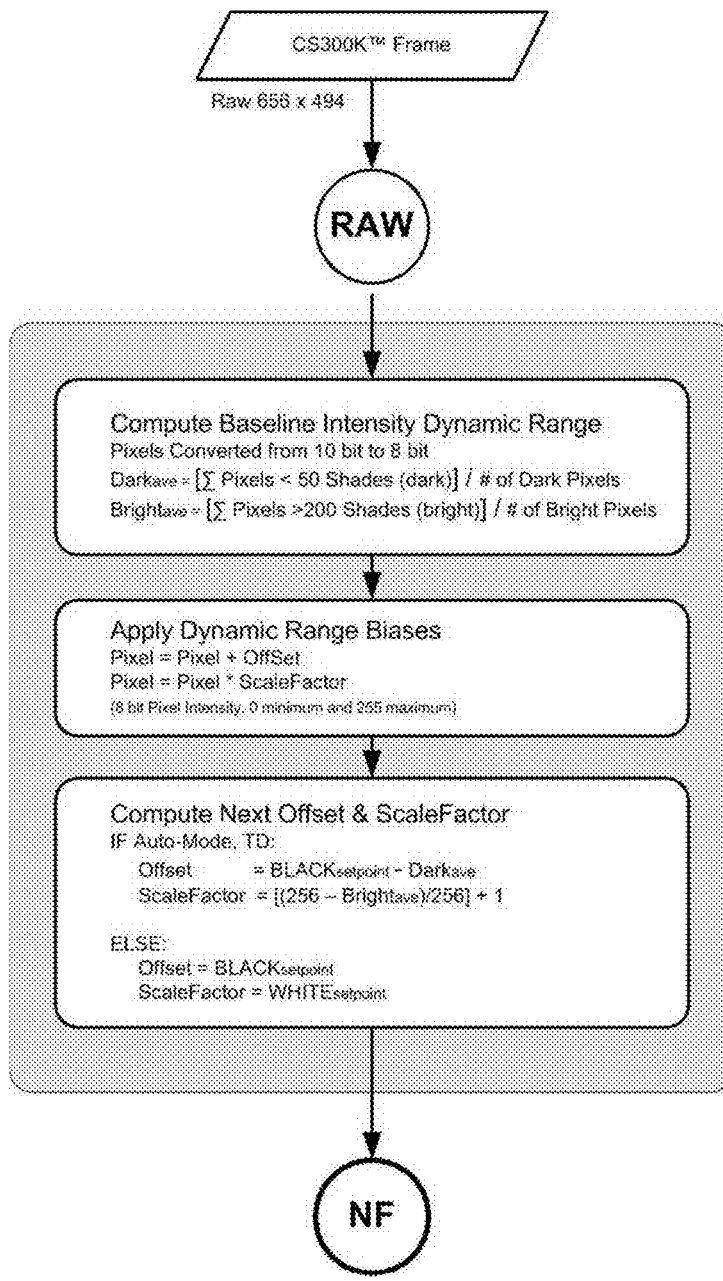
FIG. 5 illustrates an exemplary process performed by the Pixel Normalization.

FIG. 5 illustrates an exemplary process performed by the Pixel Normalization. Exemplary steps include computing baseline intensity dynamic range, applying dynamic range biases such as the offset and scaling factor values, and computing next offset and scaling factor values. RAW frames are delivered to the processor in columns and rows of pixels that were all exposed at the same time. The three steps shown in FIG. 5 take the overall frame and apply a means to normalize the measurement dynamic range. Each pixel is processed and a new compensation is computed for the next frame. The pixel is compared for its value being dark or light and counted. While at the pixel, an offset is added and a scale factor applied. Next, high/low 'bin' counts are used to influence the subsequent application of the offset and scaling factor to the future image frame. The interface supports manual setting of the offset and scaling factor from static to frame-rate speeds. This mode can provide an external algorithm control.

Referring again to FIG. 4, a next set of processes is referred to as Frame Registration where the Normalized Frame (NF) is registered in the plane of the detector array by using fiducial locations in the field of view (FOV) and setting buffer pointers. Specific locations in the FOV are used to find horizontal and vertical guides to keep frame to frame registration. Frame Registration accounts for device vibration and other factors that may slightly alter the position of the device from frame to frame. Using the Pixel Normalization and Frame Registration processes, each image frame is registered according to roll, pitch, and exposure to provide frame to frame consistency for determining changes in a known background.

Figure 6:
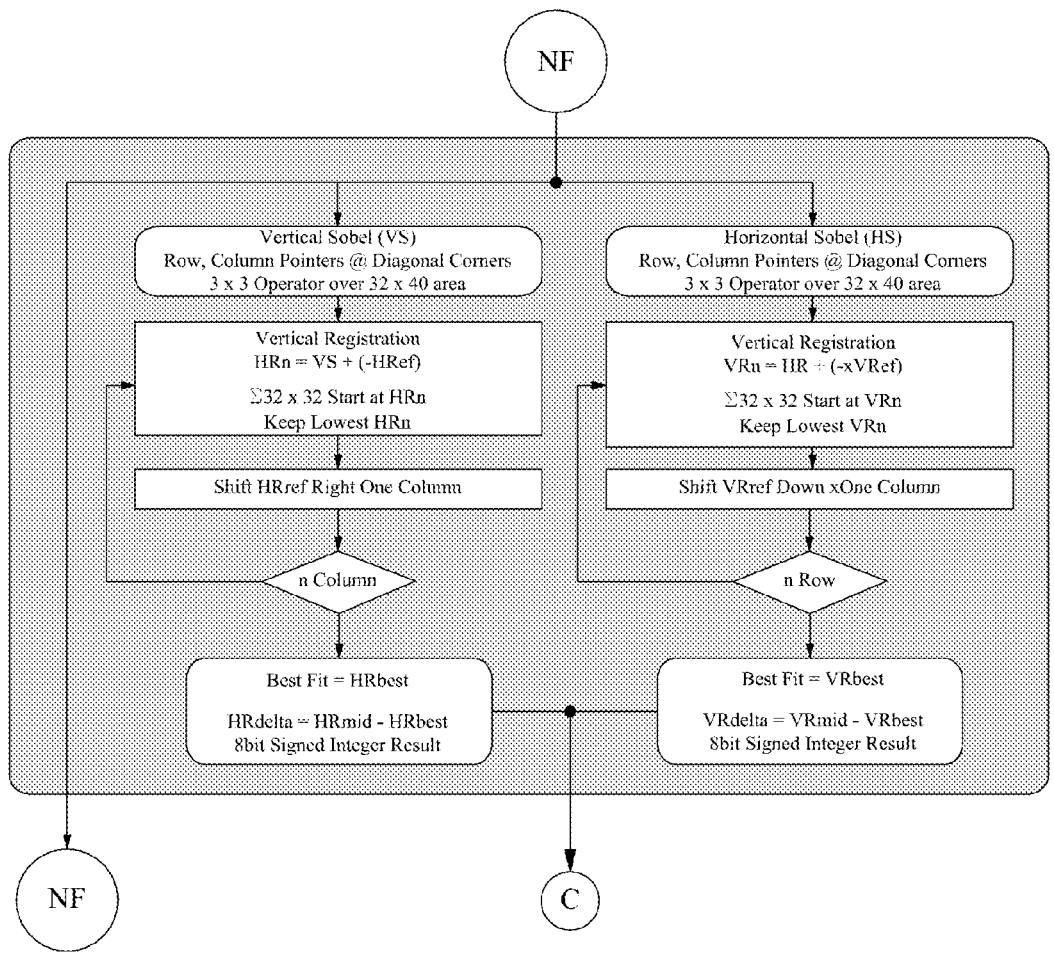
FIG. 6 illustrates an exemplary process performed by the Frame Registration.

FIG. 6 illustrates an exemplary process performed by the Frame Registration. Exemplary steps include setting a vertical sobel and horizontal sobel, performing horizontal and vertical registration on each row and column, and iteratively shifting the frame by row and column to achieve the best fit alignment between the current frame and the reference patterns. The Frame Registration process keeps each new image buffer correlated in space to the systems subsequent processing. This step precedes any spacial algorithms and is used to provide system accuracy and to limit false alert events due to minor vibration. The correction factor is limited to an integer column or row movement in the buffer pointers and does not feature fractional pixel math, image rotation or warp. Areas within the FOV are selected at the time of system configuration and calibration. The function of Frame Registration process is to 'pattern match' in known locations inside the image buffer that have high vertical content for adjusting column position and an area with high horizontal content for adjusting row position. Since the correction at this algorithm revision is simple, only a single location for each axis is needed. The output C of the Frame Registration is the correction metrics for properly aligning the current frame.

During calibration, described below, the system administrator selects reference points in the image, for example using a mouse click during live video. In some embodiments, the calibration procedure requires several repetitious re-selections of the same point to ensure stability and spatial definition is achieved. Stability is determined by computing the pattern's 'strength of uniqueness' along the axis used for registration. The reference patterns, one horizontal and one vertical, are then saved and used to guide each frame's adjustment. The vertical and horizontal reference patterns can have an adaptive feature, such as that in the Pixel Normalization process. In the process steps shown in FIG. 6, the process is simplified by knowing all frames have been 'normalized' in the Pixel Normalization process.

In an exemplary application, each reference pattern area uses 40 columns and 32 rows for horizontal and 32 columns and 40 rows for vertical adjustments. The reference pattern is moved along the object axis starting 4 columns from the expected reference point. The reference pattern is stepped through the image buffer eight times and at each time a correlation of the reference pattern to the image data is computed and the closest fit is saved. Following 8 shifts and computations, the highest match is used to register the frame during the Crop Frame process described below.

Referring again to FIG. 4, a next set of processes is referred to as ON/OFF Find which determines the laser illumination state (ON or OFF). The ON/OFF Find is a calibration that is continuously checking that the laser is functioning. The ON/OFF Find observes a fiducial location in the field of view, for example a previously placed reflector, to measure an auto-reflection when the laser is ON. Determining if the laser is ON or OFF is also used for determining a subsequent set of processes. In an exemplary application where the laser pulses ON every other frame, a current frame of data is processed according to one path through the algorithm if the frame corresponds to the laser being ON and through another path of the algorithm if the frame corresponds to the laser being OFF. In FIG. 4, the output A from the ON/OFF Find step indicates that the laser is ON for the current frame being processed, and the output B representing the laser OFF. Determining if the laser is ON or OFF can also be used to determine if the device has been moved or bumped out of alignment. A sensor internal to the device can be used to detect if the laser is ON or OFF. Matching this sensor determination with the laser ON or OFF determination of the ON/OFF Find process can determine if the device is misaligned. For example, if the internal sensor detects the laser ON, but the ON/OFF Find process determines the laser OFF, then the device is most likely misaligned.

Figure 7:
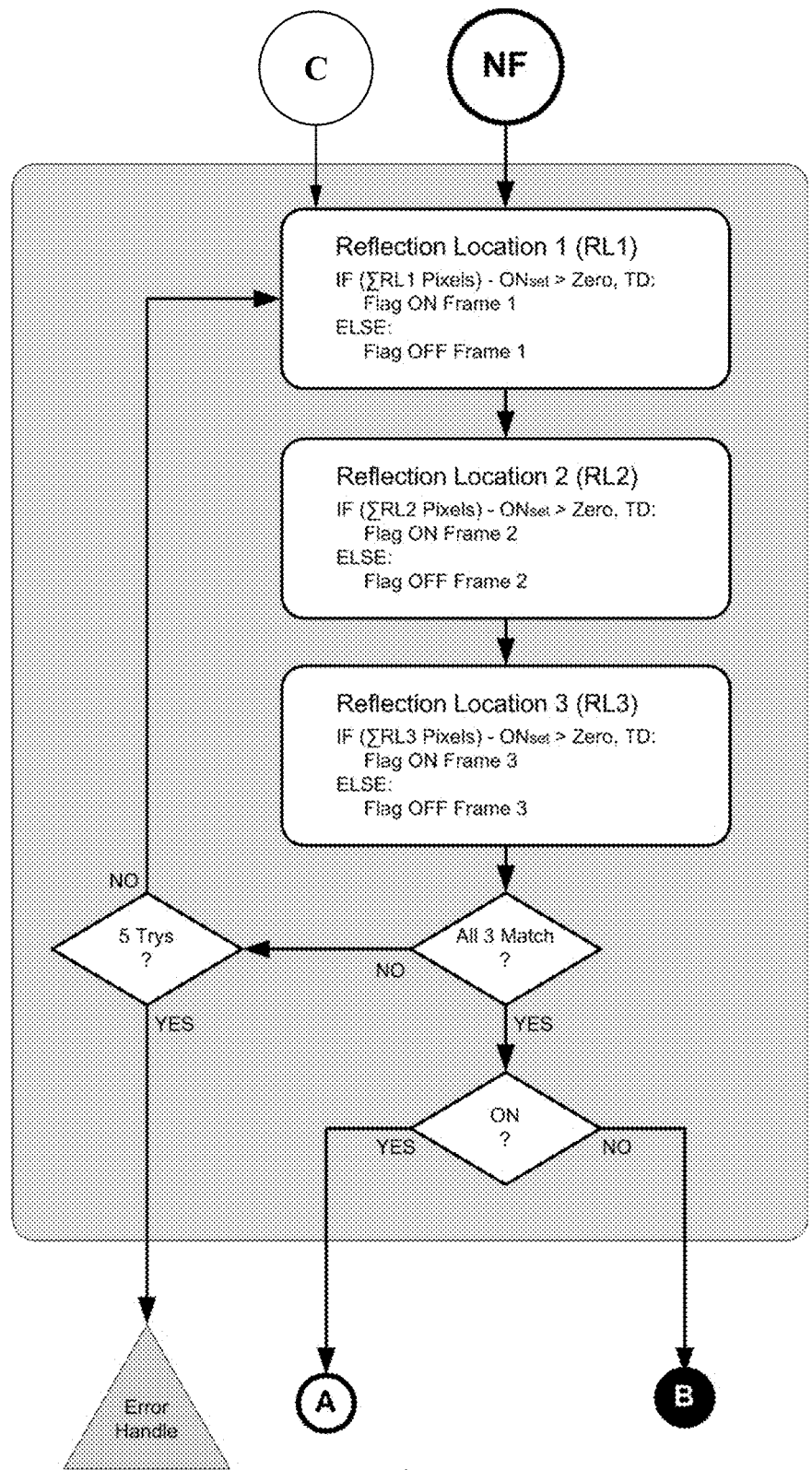
FIG. 7 illustrates an exemplary process performed by the ON/OFF Find.

FIG. 7 illustrates an exemplary process performed by the ON/OFF Find. The ON/OFF Find process receives the Normalized Frame (NF) from the Pixel Normalization process and the correction metrics C from the Frame Registration process. Exemplary steps include determining auto-reflection from each of three points in the FOV set during a calibration step. During camera installation, the calibration step establishes three points in the FOV that will provide a positive reflection for determining the laser's state. Confident determination of the laser state is found by testing and finding all three set pixel locations in either the ON or OFF laser state. Application of the correction metric C assures measurement against the proper three points in the FOV. If after five tries on sequential image frames, a unanimous state is not reached, an error flag is set showing an indeterminate state. It is understood that more or less than three points can be used.

Another condition that results in an error state is when the state of the laser is always ON. During the daylight hours and for illuminators with laser power set at a Class IIIb level, the sunlight will over power the laser. Hence, in some embodiments, the counter-surveillance detection algorithm always sees the laser ON and not the normal strobing condition. An error state is generated and is used to set a DAY mode of counter-surveillance detection algorithm. Once the normal laser strobe is detected, the counter-surveillance detection algorithm is set back to a NIGHT mode. The counter-surveillance detection algorithm operates in a DAY mode only with a single feature extraction process, the Kinetic Extraction ON (KEon) process. In the NIGHT mode, the counter-surveillance detection algorithms works with three feature extraction processes, a Glint Extraction (GE) process, the Kinetic Extraction ON (KEon) process and a Kinetic Extraction OFF (KEoff) process. The Kinetic Extraction ON (KEon) process and the Kinetic Extraction OFF (KEoff) process are described in detail below.

Referring again to FIG. 4, a next set of processes is referred to as Crop Frame which crops the Normalized Frame (NF) to an area of interest (AOI) defined in the configuration. The AOI is a subset of the FOV. The AOI is used to reduce the computation overhead and reduce the number of pixels that may generate noise. Known pixel locations in the FOV are used to measure the radiance and compare to set levels that are fixed during a calibration step and then adapted over time.

Figure 8:
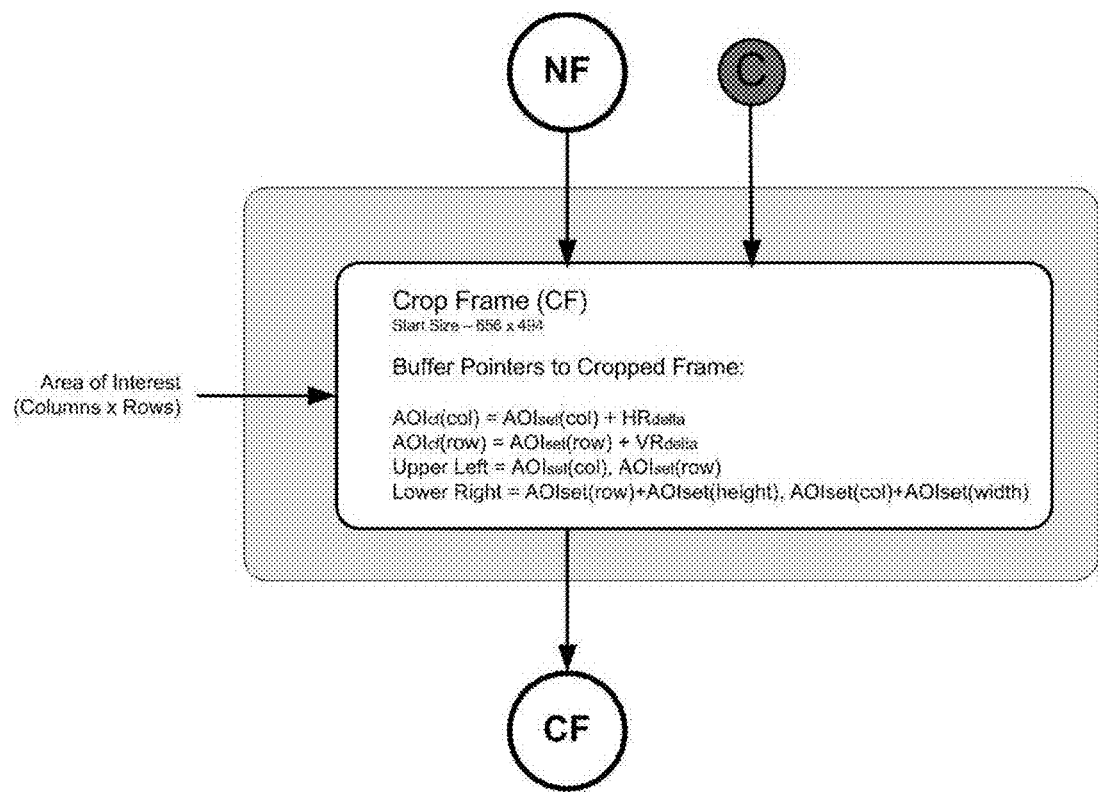
FIG. 8 illustrates an exemplary process performed by the Crop Frame.

FIG. 8 illustrates an exemplary process performed by the Crop Frame. The Normalized Frame (NF) size may be larger than the AOI and can be cropped. Cropping reduces result errors by eliminating pixels in part of the FOV that are not part of the counter-surveillance sight line. The AOI is defined by an input value that specifies columns and rows. The current frame's registration offsets are applied to the Cropped Frame's pointers. Output C from Frame Registration include first order x and y adjustments which are combined with the AOI to crop the NF to create a Cropped Frame (CF).

Referring again to FIG. 4, the Cropped Frame (CF) is presented to multiple process threads. Each frame is tagged with an illumination state (laser ON or laser OFF), as determined by the ON/OFF Find process, and a time stamp, for example 0.001 s resolution. Also note the image frame data array has not been computationally touched across pixel boundaries.

Scene backgrounds, or known backgrounds, are determined and compared to a current frame, where a difference between the two may be a basis for detecting a foreign object present in the FOV. Two different BackGround Frames (BG) are determined. A first BackGround Frame (BG) is determined for those Cropped Frames (CF) tagged with the illumination state laser ON, referred to as Cropped Frames ON (CFon). The first BackGround Frame is referred to as BackGround Frame ON (BGon). A second BackGround Frame (BG) is determined for those Cropped Frames (CF) tagged with the illumination state laser OFF, referred to as Cropped Frames OFF (CFoff). The second BackGround Frame (BG) is referred to as BackGround Frame OFF (BGoff). The CFon or CFoff frames are applied to the appropriate BackGround algorithm, either the ON BackGround algorithm or the OFF BackGround algorithm, to maintain an adaptive scene reference. From an administrator control GUI, the BackGround algorithms can be changed or held from updating.

In some embodiments, each BackGround Frame (BF) is determined as a running average of N previous Cropped Frames (CF). In an exemplary application, the BackGround Frame ON (BGon) is determined using the 8 most recent Cropped Frames ON (CFon) and averaging each pixel value in the 8 frames. As the next Cropped Frame ON (CFon) is processed, the BackGround Frame ON (BGon) is determined by dropping the oldest of the 8 frames and adding the newest Cropped Frame ON (CFon) and determining the average for each pixel. It is understood that more or less than 8 frames can be used to determine the BackGround Frame (BG). It is also understood that frames other than the most immediately preceding frames can be used to determine the BackGround Frame (BG). It is also understood that alternative methods to straight line averaging can be used to determine the individual pixel values in the BackGround Frame (BG). For example, each frame used to determine the BackGround Frame (BG) can be weighted differently, such as more recent frames having higher weighting than preceding frames.

Figure 9:
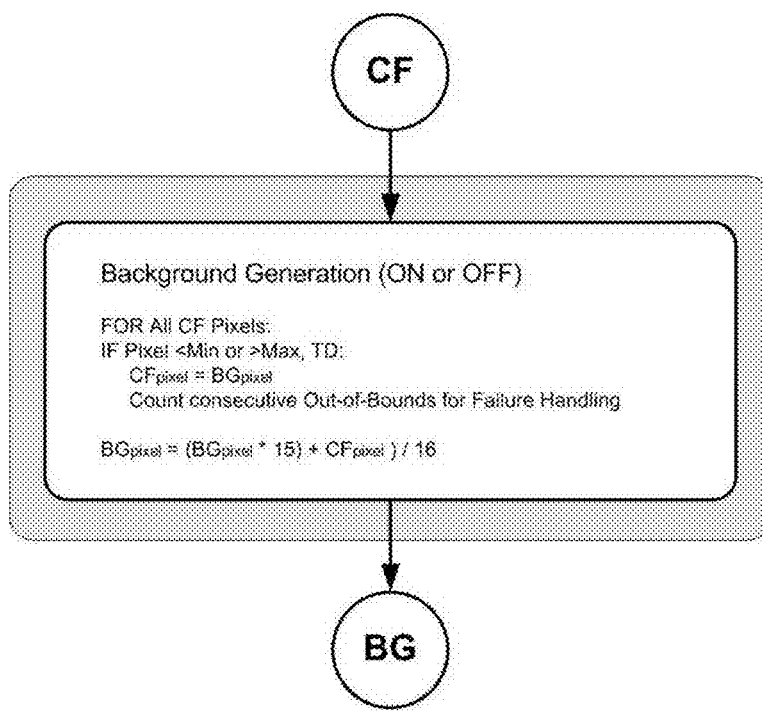
FIG. 9 illustrates an exemplary process performed by the ON or OFF BackGround.

FIG. 9 illustrates an exemplary process performed by the ON or OFF BackGround. The process shown in FIG. 9 represents the general application. In some embodiments, where the Cropped Frame (CF) is the Cropped Frame ON (CFon) then the process performs as the ON Background and outputs a BackGround Frame ON (BGon), and where the Cropped Frame (CF) is the Cropped Frame OFF (CFoff) then the process performs as the OFF Background and outputs a BackGround Frame OFF (BGoff). In some embodiments, the mathematical processes performed in the ON Background and OFF Background process are the same. The scenic background, or known background, represents the camera's normal FOV without foreign objects present. As described above, the background is generated by taking multiple successive frames and performing an average pixel value for each pixel. The number of frames taken varies by conditions of the camera's environment and if mounted on a pan/tilt positioner. For cameras with staring sight-lines and no normal motion, a larger set of frames are used to enable a more stable detection reference image or background.

Referring again to FIG. 4, a frame comparison between the Cropped Frame (CF) and the appropriate BackGround Frame (BG) is made to determine a difference, referred to as a Difference Frame (DF). In most applications, each Cropped Frame ON (CFon) is compared to the BackGround Frame ON (BGon) to result in a Difference Frame ON (DFon), and each Cropped Frame OFF (CFoff) is compared to the BackGround Frame OFF (BGoff) to result in a Difference Frame OFF (DFoff). Alternative applications are also contemplated in which different combinations of differences between Cropped Frames and BackGround Frames are compared. For a current Cropped Frame (CF), the Difference Frame (DF) is determined before the BackGround Frame (BG) is updated using the current Cropped Frame (CF).

The Glint Extraction (GE) and Kinetic Extractions (KE) are algorithms that cross pixel boundaries to locate macro-features that make-up the signature of in-coming surveillance. Each Extraction sweeps through the Difference Frame (DF) one centered pixel at a time looking for numeric 'hits' for Glint or Motion.

Figures 10, 11, 12:
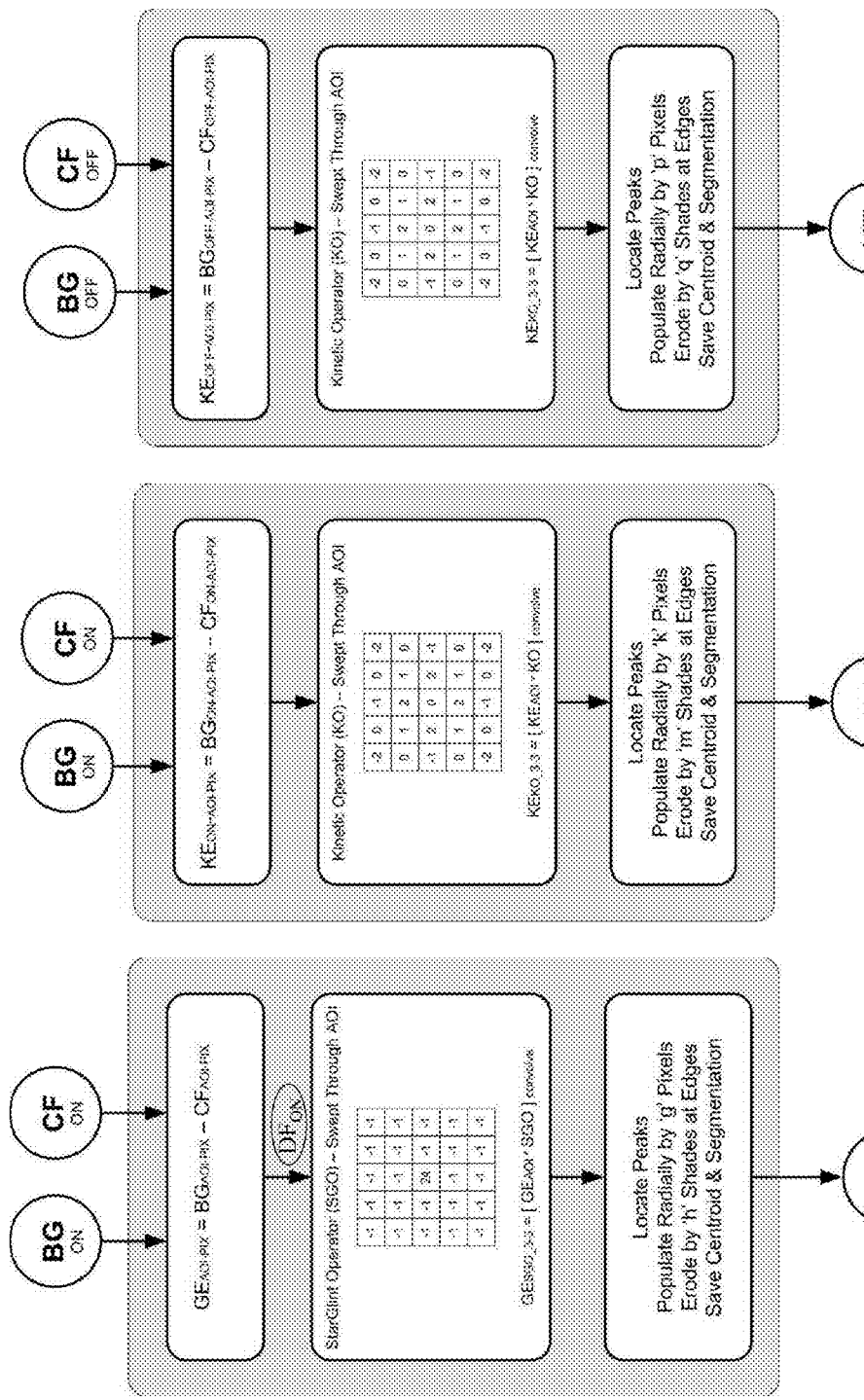

FIG. 10 illustrates an exemplary process performed by the ON Background and the Glint Extraction (GE). The difference between the Cropped Frame ON (CFon) and the BackGround Frame ON (BGon) frame pixels is determined which results in the Difference Frame ON (DFon), represented in the Glint Extraction (GE) process of FIG. 10 as GEaoi-pix. An objective of the Glint Extraction (GE) is to find bright pixels, such as an optic with an auto-reflection, that are candidates for foreign objects present in the FOV. The result is typically a flat field near zero intensity value. The background and the new frame are normally equal unless there is a change, like an observer raising a binocular. The Difference Frame ON (DFon) is processed with an operator, such as a Kernel, optimized to reveal bright pixels. The Kernel is comprised of coefficients to expose the center pixel as a high intensity reflection. The Kernel shown in FIG. 10 is a 5×5 matrix. Alternative Kernels can also be used. The Kernel is applied to each pixel in the Difference Frame ON (DFon). After the operator has swept through the complete pixel array, the next step dilates adjacent bright pixels by a radial pixel count established during the system configuration. Dilation aggregates proximate bright pixels according to defined parameters, such as separation and pattern. Bright pixels next to others in the radial range are filled with the bright pixel's intensity value. Finally, an erosion step is taken to shrink the collection of bright pixels from out-liars. The aggregated pixels are then identified as a Glint Object. The Glint Object is reported by a pixel location as the centroid of the Glint Object and by a pair of opposing rectangular coordinates. The centroid and pair of opposing rectangular coordinates are used to establish an identified object's location in the image buffer as the object moves through the processing thread. These coordinates are additionally used as a means to "paint" a box around the object in the output video for human appreciation. Each Glint Object is a candidate for a foreign object.

"Glint" by definition is the result of active illumination, auto-reflection. In other words, glint is the reflected light originating from the illumination source, where the reflected light is normal to the object. Two masks are generated. One mask is related to a known background when the laser is OFF and another mask is related to a known background when the laser is ON. The two masks include glint and other reflected light that are part of the known background and therefore should be eliminated as potential foreign objects.

FIG. 11 illustrates an exemplary process performed by the ON Background and the Kinetic Extraction (KE) applied to image data collected when the laser is ON, referred to as Kinetic Extraction ON (KEon). The difference between the Cropped Frame ON (CFon) and the BackGround Frame ON (BGon) frame pixels is determined which results in the Difference Frame ON (DFon), represented in the Kinetic Extraction ON (KEon) process of FIG. 11 as KEon-aoi-pix. An objective of the Kinetic Extraction ON (KEon) is to find pixels changing in comparison to the known background as related to motion, which are candidates for foreign objects present in the FOV The result is typically a flat field near zero intensity value when no motion is present. The background and the new frame are normally equal unless there is a change, like an observer raising a binocular. The Difference Frame ON (DFon) is processed with an operator, such as a Kernel, optimized to expose pixels that are changing in human-type directions. The Kernel is comprised of coefficients to expose the center pixel as moving relative to the known background. The Kernel shown in FIG. 11 is a 5×5 matrix. Alternative Kernels can also be used. The Kernel is applied to each pixel in the Difference Frame ON (DFon). The Kernel coefficients also attenuate sudden lighting changes from artificial sources. The center of the Kernel produces the pixel value to be substituted in the new pixel array buffer. After the operator has swept through the complete pixel array the next step dilates adjacent bright pixels by a radial pixel count established during the system configuration. Bright pixels next to others in the radial range are filled with the bright pixel's intensity value. Finally, an erosion step is taken to shrink the collection of bright pixels from out-liars and low intensity pixels. The aggregated pixels are then identified as a Kinetic ON Object. The Kinetic ON Object is reported by a pixel location as the centroid of the Kinetic ON Object and as a pair of opposing rectangular coordinates. Each Kinetic ON Object is a candidate for a foreign object.

FIG. 12 illustrates an exemplary process performed by the OFF Background and the Kinetic Extraction (KE) applied to image data collected when the laser is OFF, referred to as Kinetic Extraction OFF (KEoff). The difference between the Cropped Frame OFF (CFoff) and the BackGround Frame OFF (BGoff) frame pixels is determined which results in the Difference Frame OFF (DFoff), represented in the Kinetic Extraction OFF (KEoff) process of FIG. 12 as KEoff-aoi-pix. The Kinetic Extraction OFF (KEoff) process functions similarly as the Kinetic Extraction ON (KEon) process to output Kinetic OFF Objects.

Each of the three Extraction processes the Difference Frames (DF) to determine pixels that deserve to be considered as glint or motion and therefore are candidates to be foreign objects in the FOV. The Glint Objects, Kinteic ON Objects, and the Kinetic OFF Objects have met threshold values and are forwarded to the Results Correlation (RC) for further consideration.

Referring again to FIG. 4, the Glint Extraction (GE), the Kinetic Extraction ON (KEon), and the Kinetic Extraction OFF (KEoff) pass their detected pixel coordinates, the Glint Objects, the Kinetic ON Objects, and the Kinetic OFF Objects, respectively, to the Results Correlation (RC) process. There are also data paths for the RAW frame, the Normalized Frame (NF), and Cropped Frame (CF) to be input to the Results Correlation (RC).

Figure 13:
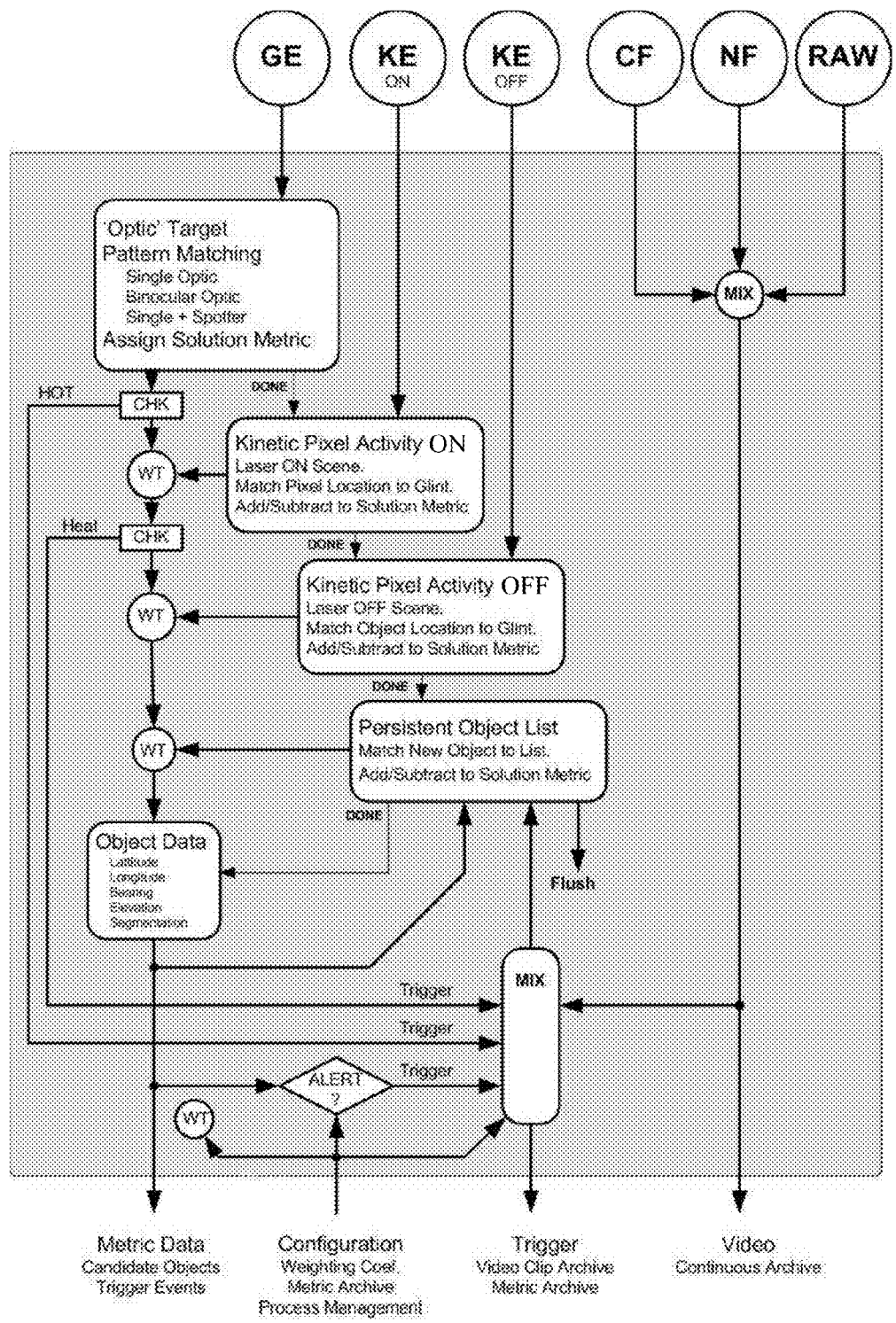
FIG. 13 illustrates an exemplary process performed by the Results Correlation (RC).

FIG. 13 illustrates an exemplary process performed by the Results Correlation (RC). At each new frame, the three extraction sources may have none or many detected objects. The Glint Objects and Kinetic Objects are resolved on the local map. Glint Objects are further classified by running a collection of known optic targets, such as eyes, field glasses, sniper scope, spotter scope, video camera, etc, and create a best fit down-select category. Each Glint Object is expected to match something either precisely or fuzzy. By a numeric resultant of the pattern match algorithm, a comparison is made to existing objects with lesser thresholds (down select) equating to a category. The result of the pattern matching can be quantified as a solution metric.

Correlation of the Glint Objects, the Kinetic ON Objects, and the Kinetic OFF Objects is controlled by coefficients (weights and thresholds) that have been set during the calibration process and by the user during operation. The resultant output can initiate an EVENT, or trigger, and the archiving of one or more of the video images and computed backgrounds.

The Glint Objects, the Kinetic ON Objects, and the Kinetic OFF Objects are processed in a sequence dependent on either DAY or NIGHT conditions and flow from the top down in FIG. 13.

Figure 14:
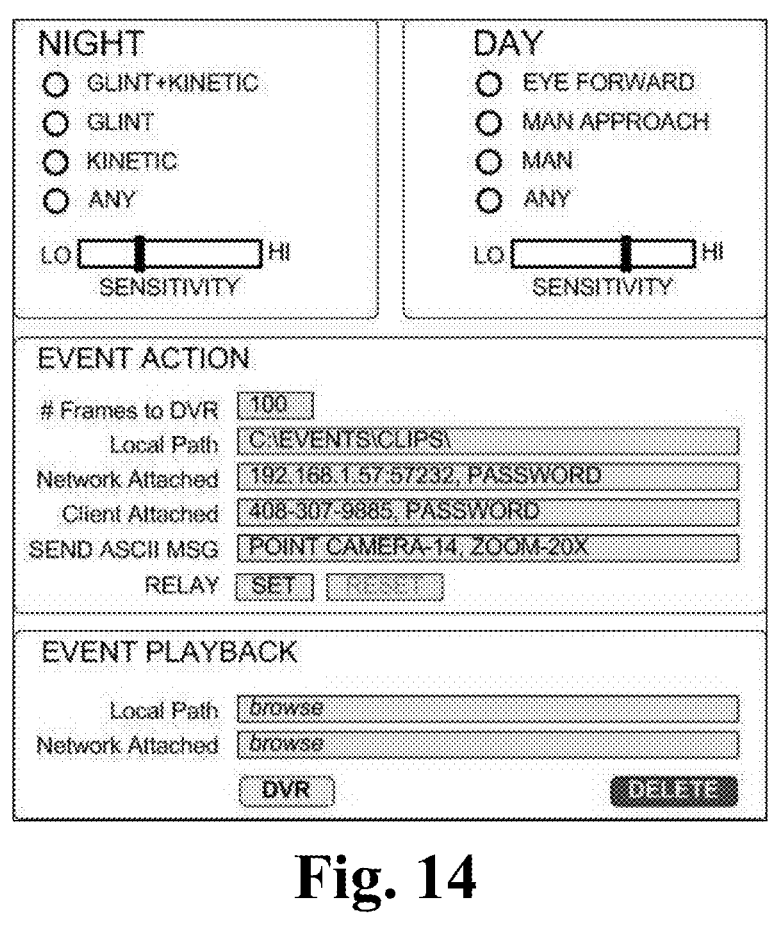

The user has a control GUI, such as that shown in FIG. 14, to set the type of EVENT detection and a method to set a level of sensitivity according to a NIGHT mode or a DAY mode. The NIGHT mode is determined by the device and algorithm. During camera and software installation, one to three reflective target locations in the camera's field of view with high laser reflection are established. These locations are either native within the FOV or are installed, such as reflectors. When the algorithm detects a laser flash sequence it is determined to be NIGHT. When the reflective targets are always bright, it is determined to be DAY.

The Glint Objects are only available during NIGHT (the laser flash produces a detectable auto-reflection). They enter as a singular Glint Object and are inspected for their intensity value and further analyzed for known pattern signatures, such as binocular or shooter-spotter pattern signatures. For example, pattern matching to the binocular or shooter-spotter pattern signatures is accomplished by taking the Glint Object's location and searching primarily horizontally to find a Glint Object mate fitting the constraints of the predefined pattern signatures. If the resulting Glint Object is singular with a very high intensity or paired, and the user selected GLINT as the EVENT director in the control GUI of FIG. 14, the result is immediately pushed as a trigger to the ALERT processor, MIX.

The Glint Object moves down the process flow of FIG. 13 regardless if a trigger is sent as a result of the Glint Object analysis. At the next processing node, the Kinetic ON Objects are sequentially searched for overlapping properties with the Glint Object. The Glint Object data structure is augmented by any Kinetic ON Object that is spatially coincident. An object's data structure, or solution metric, is a collection of the object's characteristics. Augmentation of the object's data structure also results in augmentation of the solution metric corresponding to the object. The object's location in pixel space is used for results correlation. Further, if the user selected GLINT+KINETIC under NIGHT in the control GUI of FIG. 14, then both the Glint Object's location and the Kinetic ON Object's location need to be coincident to initiate an EVENT which is tagged as an ALERT and moved directly to the MIX.

At the next processing node, the Kinetic OFF Objects are searched for spatial overlap with Glint Object. For any Kinetic OFF Object found coincident with the Glint Object, the Glint Object data structure is again augmented.

A next processing step is a spatial comparison against a Persistence List of Glint Objects. Every Glint Object makes it to the bottom of the process flow and is inserted to the Persistence List. The Glint Object is either an existing Object or a new Object. An existing Glint Object has its sequence count incremented, Persistence Index, or a new Glint Object is created in the Persistence List. After the last Glint Object is processed, the Persistence List is checked for any Glint Objects not incremented and those Glint Objects are then decremented. The increment and decrement scaling is initially set to one and can be modified by the configuration menu. When an Object's Persistence Index reaches zero, the Object is flushed from the Persistence List. The Glint Object data structure is again augmented according to the count of the corresponding Object in the Persistence List. In some embodiments, if the count exceeds a threshold value, a trigger is sent to the MIX.

After each Glint Object is sequenced through the algorithm pipe, the processing moves to the Kinetic ON Objects that have not been previously connected to a Glint Object. The Kinetic ON Object is spatially tested with the Kinetic OFF Objects. Where there is overlap, the Kinetic ON Object data structure is augmented to show the relationship. As the Glint Objects and the Kinetic ON Objects correspond to a Difference Frame ON (DFon) and the Kinetic OFF Objects correspond to a Difference Frame OFF (DFoff), the most recent Difference Frame OFF (DFoff) and its corresponding Kinetic OFF Objects are held for an additional frame time in order to be compared to the Kinetic ON Objects corresponding to a current Difference Frame ON (DFon).

The last spatial comparison for the Kinetic ON Object is against a Persistence List of Kinetic ON Objects. Like the Glint Objects, there is a Persistence List for the Kinetic ON Objects and a like process for creating, incrementing, decrementing and flushing. In some embodiments, at a Persistent Index count related to the Kinetic ON Object that meets a programmable threshold, a trigger is sent to the alarm algorithm MIX.

After each Kinetic ON Object is sequenced through the algorithm pipe, the processing moves to the Kinetic OFF Objects that have not been previously connected to a Kinetic ON Object. The Kinetic OFF Object is compared to a Persistence List of Kinetic OFF Objects. Like the Kinetic ON Objects, there is a Persistence List for the Kinetic OFF Objects and a like process for creating, incrementing, decrementing and flushing. In some embodiments, at a Persistent Index count related to the Kinetic OFF Object that meets a programmable threshold, a trigger is sent to the alarm algorithm MIX.

In general, a trigger can be generated in response to the results of the Glint Object analysis, the Kinetic ON Object analysis, the Kinetic OFF Object analysis, the Persistent Object analysis, or any combination thereof depending on the control settings and established thresholds. In some embodiments, the results of each analysis is a numerical value that is summed with the numerical values output from each other analysis to form a cumulative value. In some embodiments, a weighting coefficient can be applied to each numerical value, each weighting value assigned during configuration. The cumulative value is associated with the Glint Object data, shown as "Object Data" block in FIG. 13. The cumulative value is compared to a threshold value to determine if a trigger is generated.

The MIX processor generates the actions resulting from the triggers. The number of actions coupled to the type of alert set the number of options available for the system to respond to different types of EVENTs. From the simple menu selections shown in FIG. 14, there is a single EVENT that triggers the actions listed. A Digital Video Recorder (DVR) selection lets a set number of Frames during the alert be saved locally and at a networked attached storage device. The set of alert Frames can be forwarded to an external device such as a smart phone or client (laptop). Programmed ASCII messages can be transmitted on an available serial COM port or activating a Relay for dry contact closure. Replaying the alert frames can be randomly accessed by setting the storage path and the date/time of the EVENT. The frames can be exported.

The process flow described above corresponds to the NIGHT mode. During the DAY mode, the Kinetic Extraction OFF becomes the significant indicator of Objects moving in the background. The laser remains active but the Glint Object processing is modified to start with the Cropped Frame (CF) difference with the BackGround Laser OFF. The Kinetic Extraction ON processes are bypassed and the Kinetic Extraction OFF processes proceed as normal. In the NIGHT mode, the laser remains active but the Glint Extraction (GE) processes and the Kinetic Extraction ON processes are bypassed. Once the laser is detected, the Glint Extraction (GE) processes and the Kinetic Extraction ON processes are resumed in the Results Correlation (RC).

Figure 15:
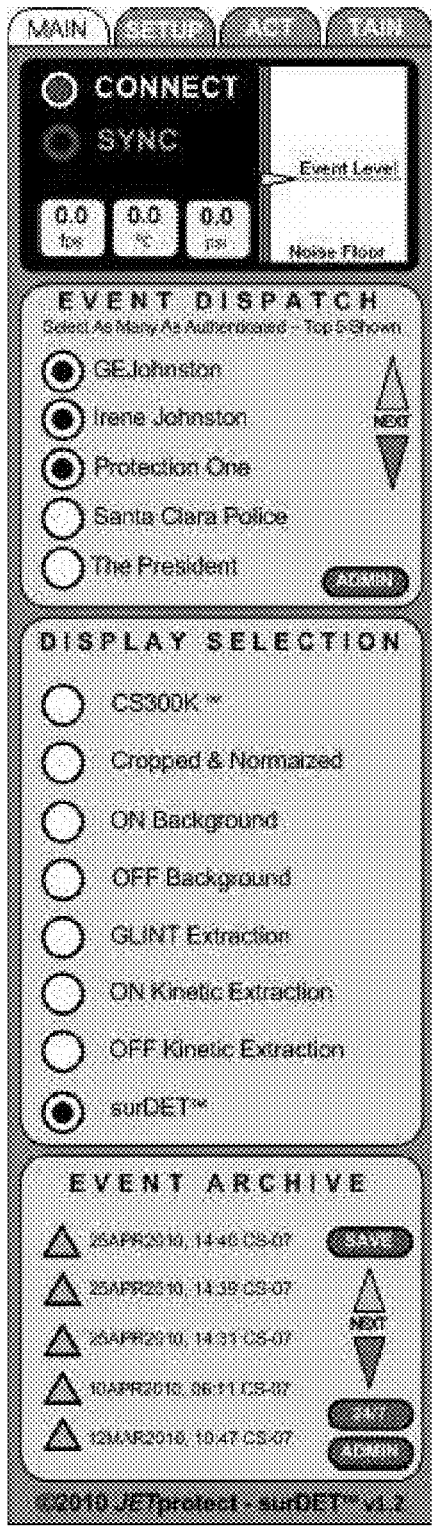
FIG. 15 illustrates a screenshot of an exemplary MAIN GUI.

An operational goal of the system is to provide a 24/7 starring vigil and to initiate immediate event responses. The trigger event rate can be adjusted to meet the environment and level of awareness that is required. Status and part of the system configuration is accomplished through a MAIN GUI. FIG. 15 illustrates an exemplary MAIN GUI. A CONNECT button is the power, activation, and authentication of the device. Using the SYNC button, the device synchronizes the laser fire control to the frame processing by recognizing the state of the laser from the image data. The number of frames processed per second is displayed in the lower left corner beneath the SYNC button. The Event sensitivity vertical slider adjusts the detection threshold as the noise of the environment is different from setup to setup.

From this menu of registered alert event recipients, those selected can be witnessed and changed. By clicking on the radio or name, the device can activate that registrant to receive alerts (ON has the black inner mark). The registration or removal of recipients can be made from the Administrator application, accessed using the ADMIN button. If the number of recipients exceeds five (5), the up and down NEXT buttons are active.

The "Display Selection" window can display the different states of the camera data. The CS300K™ is the 'raw' image data. Cropped & Normalized shows only the active pixels selected by user. ON Background is the steady state of the view with the laser on. OFF Background is the steady state of the view with the laser off. GLINT Extraction is the difference between the ON Background and the latest frame (laser on) and is swept with the Glint Operator. ON Kinetic Extraction shows motion pixels when the laser on. OFF Kinetic Extraction shows motion pixels when the laser off. surDET™ is the resultant window of found Glint.

The latest alert events are available for random replay at any time. A display window (not shown) can used to play the archived EVENT. The device and algorithm continues to run, interrupt archive review with new EVENTs, and record continuously. The SAVE button is a means to record the current scene as an EVENT.

Figure 16:
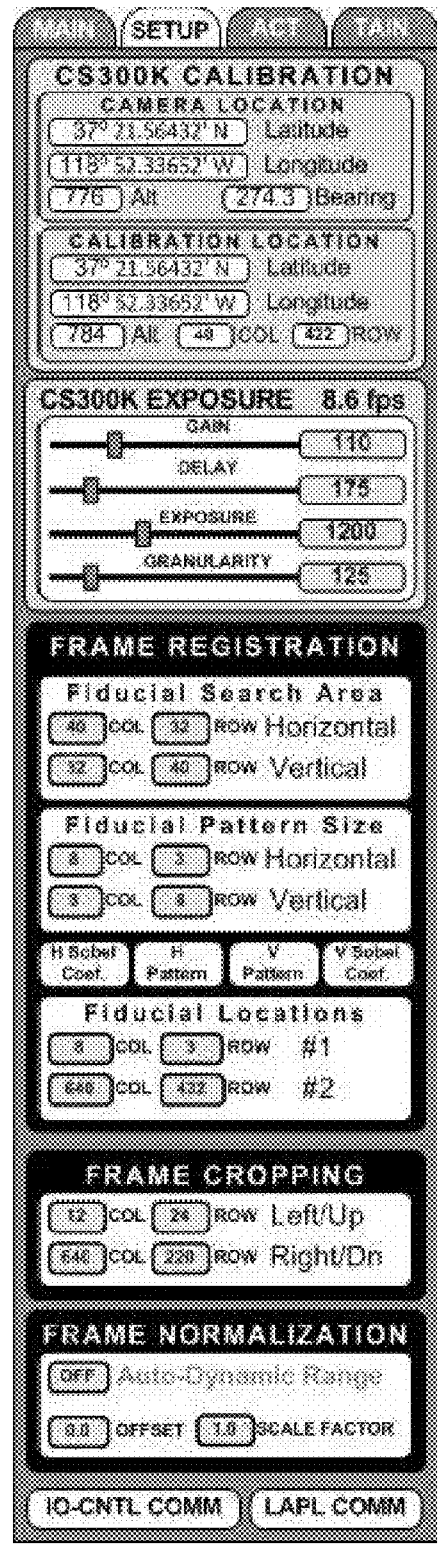
FIG. 16 illustrates a screenshot of an exemplary SETUP GUI.

The device is installed and its FOV is set to the security requirement. The Objects detected by the camera have their position determined and reported with the video data. Location computations are based on calibration information provided at the time of installation. The calibration of the device's FOV is accomplished through a SETUP GUI, an example of which is shown in FIG. 16.

In an exemplary configuration, the FOV includes approximately 307,000 pixels that are staring into space. Pixels below the horizon hit the Earth. For each starepixel below the horizon it hits a specific point on the Earth and can be tied to a common coordinate system. The camera installation point and its reference to North are set in the first part of the CS300K CALIBRATION GUI section. To complete the calibration to each starepixel, one is tied to Earth in the GUI. The location of a single pixel that can see a known spot on the ground is the basis of the entire array's calibration.

The camera's exposure can be set when the system is operated in a manual mode. DELAY can lower the frame rate while keeping the exposure time fast. Sensor light integration time is set by multiplying EXPOSURE, GRANULARITY and the minimum time increment of 30 ns.

A fundamental base of the system is the stability of the 'background'. If the camera moves or vibrates, the whole image is moving relative to the last frame. The FRAME REGISTRATION section of the SETUP GUI establishes an area in the image that provides horizontal and vertical references to establish the frame alignment to <1 pixel. The selected area for horizontal and vertical can be at the same pixel coordinates but is defined by selecting an area that generates high-Q with the search algorithm. At installation calibration, the operator confirms an area in the FOV that meets the precision and then can witness the area and the calibration matching pattern. The Sobel operators can be adjusted by touching the button and exposing the editable coefficients. One FOV can be selected to optimize lighting, processor speed, storage requirements and network bandwidth.

The Cropped array of pixels are individually adjusted by an algorithm to keep the overall dynamic range of intensity at an optimal signal level. This is accomplished manually by turning the Auto off and entering an OFFSET and SCALE FACTOR.

Direct communication with the EP1's power controller or the laser fire control is accessed by touching the IO-CNTL COMM button or the LAPL COMM button, respectively.

Figure 17:
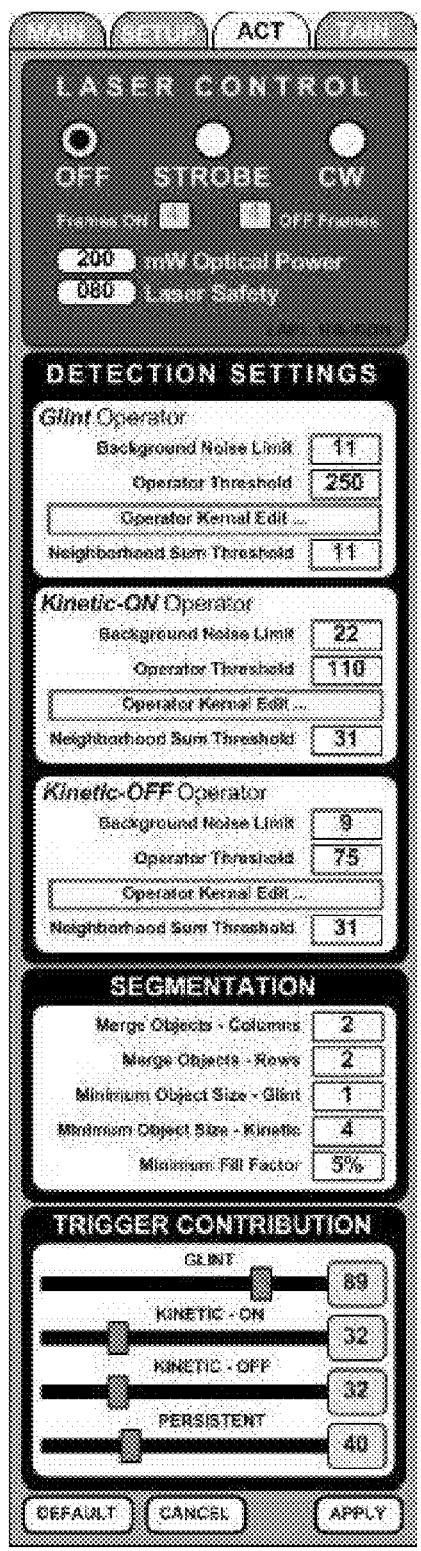
FIG. 17 illustrates a screenshot of an exemplary ACT GUI.

An ACT GUI, an example of which is shown in FIG. 17, calibrates aspects of the Results Correlation (RC) process by setting the laser control, detection levels from the image data and the adjustments to components that make up an Event. Laser fire control and the basic setting for surveillance detection are set on the ACT GUI. The laser operates in two modes. The primary mode is a STROBE profile that fires the laser for a number of frames and then is off for a number of frames. The number is set in the boxes below the STROBE radio button. CW is a continuous mode and the laser is on for every frame, but actually the laser is only on during the camera's light collection period. Laser optical power is manual as well as the laser safety index. This laser safety value is used in conjunction with a photocell mounted at the front bezel to detect humans that are close and shut-down the laser.

DETECTION SETTINGS are algorithmic values used at different stages during the image processing. Their results detect in-coming surveillance. Each pixel carries its past (background) and its variance. For a pixel to be in motion, its intensity value needs to exceed the background value by more than its variance (Background Noise Limit). There are three feature extraction processes. Each process uses pixel variation thresholds to improve signal above noise. Then a specific convolution operator is swept through the Cropped image to locate 'action' pixels. Finally, the located action pixels are combined with nearest neighbors.

The SEGMENTATION phase of processing determines if a collection of pixels represent an Object of interest and placed on a list. First, detected clusters of pixels are merged by a radial (square) distance. The Objects are then tested for minimum size to remain in the list. The final test is a measurement of the density in the segmented Object.

The system has the flexibility to form complicated interactions from multiple evaluations of the image data. In this version, the mode of operation is singular at the point of initiating an EVENT. The four primary contributors to triggering an EVENT are GLINT, KINETIC extraction when the laser is on (KINETIC-ON), KINETIC extraction when the laser is off (KINETIC-OFF), and a history of objects found (PERSISTENT). The slider is a weighted value for each of the extracted metrics to finally determine that an EVENT is active. These four components are then globally modified from the SENSITIVITY slider on the MAIN GUI in FIG. 15 to adjust an arbitrary numeric threshold above which an EVENT is trigger and responses are acted on.

Settings can be changed immediately by hitting the APPLY button and returned to normal by touching DEFAULT. The CANCEL button clears any changes that occurred since the last APPLY, CANCEL or DEFAULT button hit.

Figure 18:
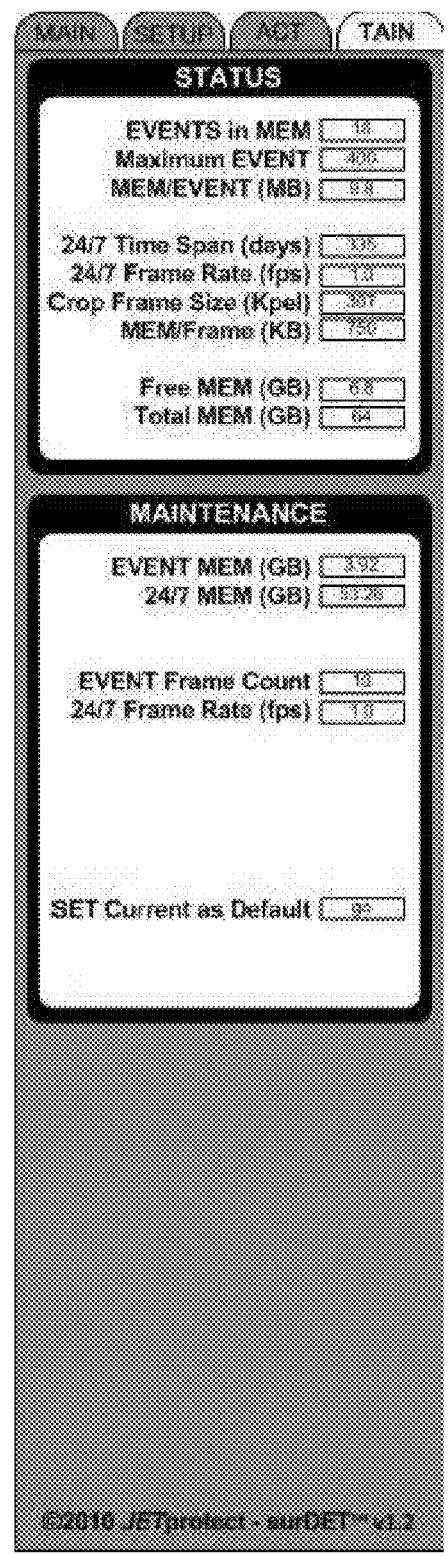
FIG. 18 illustrates a screenshot of an exemplary TAIN GUI.

Basic device status and settings are found on the TAIN GUI, an example of which is shown in FIG. 18. The STATUS section shows the current number of EVENTs in memory and available for playback. Total number of EVENTs available in the user allocated memory is determined by the system from the memory required for each EVENT. EVENT data is stored at maximum resolution and lets the user witness the results of the algorithm as if in real-time. The size of the EVENT data is dependent on the size of the cropped pixel area. '24/7' represents a continuous frame capture archive mode. The time span is determined by user specified allocated memory and cropped pixel area. 24/7 frame data is stored at maximum resolution and lets the user witness the results of the algorithm as if in real-time.

The MAINTENANCE section lets the user change memory allocation to meet the security system requirements. EVENT and 24/7 memory allocation do not exceed the total system memory. The user can SET the device's detection and extraction parameters as default. At any re-start of the application, the Default values are used to initiate the device.

Figure 19:
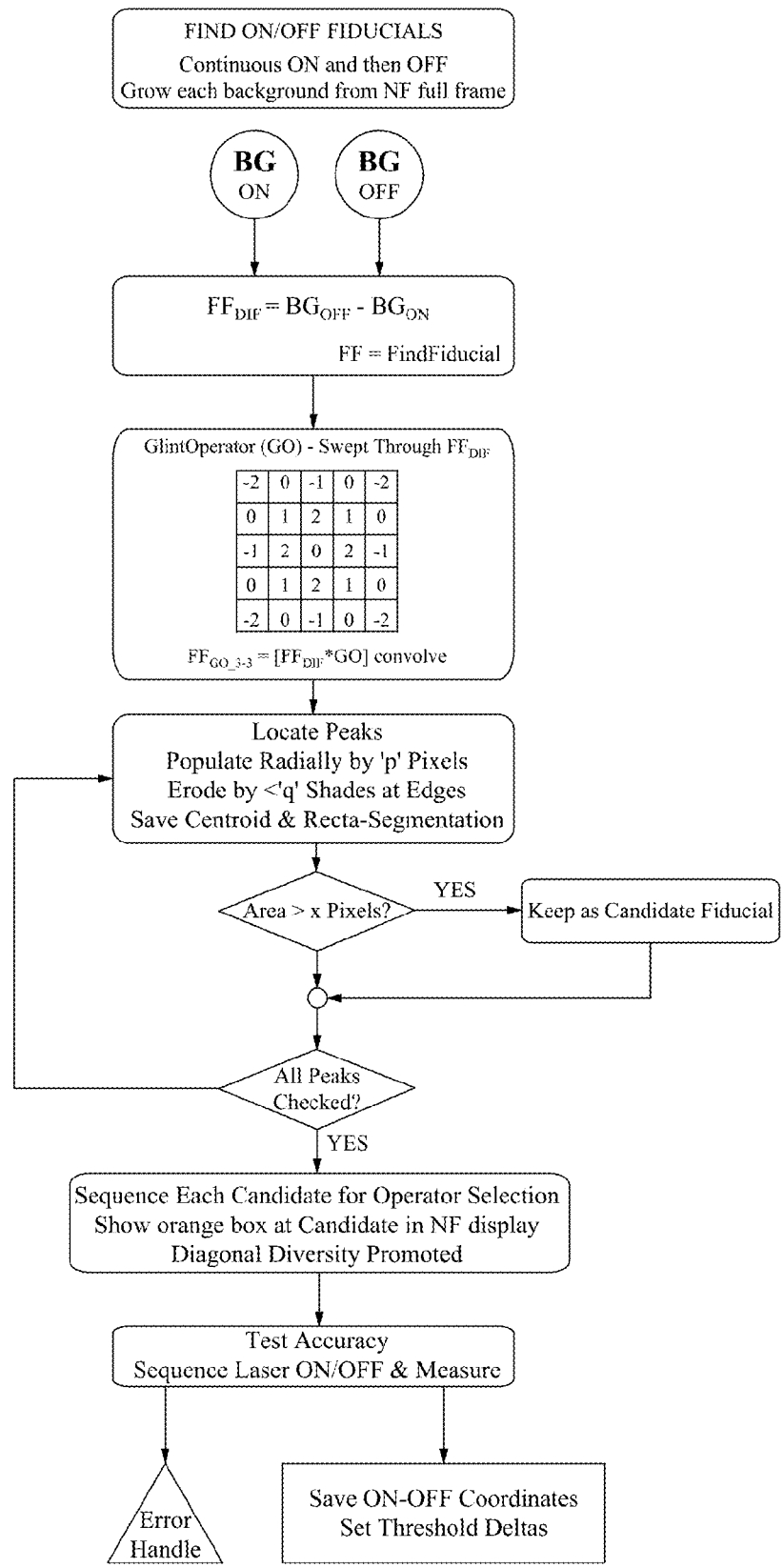
FIG. 19 illustrates a block diagram of an exemplary calibration process used for calibrating the reference fiducials used in the ON/OFF Find process.

The alignment of the camera and the lens selection are set to meet the security requirement at an installation site. During calibration, locations in the FOV are determined that enables the device to determine if the current frame has the laser ON or OFF. During daylight hours, the laser may not be seen and automatically instates a restricted combination of the different extractors to make decisions on objects at the perimeter, such as the DAY mode described above. The process of FIG. 19 is a modified version of the Glint Extraction shown in shown in FIG. 10 and is used for calibrating the reference fiducials used in the ON/OFF Find process. The calibration performed in FIG. 19 first determines Glint Objects as candidate fiducial locations and also includes user contribution for selecting one or more of the candidate fiducial locations as reference fiducials used in the ON/OFF Find process. Specifically, the user is presented with a number of Glint Objects, and the user selects one or more of these Glint Objects as references for determining if the laser is ON or OFF. FIG. 19 includes manual user interaction for selection the reference fiducials. Alternatively, the process can be modified to automatically select one or more of the candidate fiducial locations as reference fiducials by comparing the candidate fiducial locations to predefined parameters, such as Glint Object intensity, location, and pattern.

The present application has been described in terms of specific embodiments incorporating details to facilitate the understanding of the principles of construction and operation of the counter-surveillance detection system and method. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. An apparatus comprising:
   a. an illumination source configured to illuminate a field of view;
   b. a camera configured to capture a series of image frames corresponding to the field of view, wherein the camera and the illumination source are substantially co-aligned, further wherein each image frame includes auto-reflected light from within the field of view resulting from illumination by the illumination source, wherein the auto-reflected light is light from the illumination source that is reflected from an object in the field of view at a same angle as impinging light originating from the illumination source; and
   c. a means for processing the captured series of image frames to determine a set of extracted objects, the set of extracted objects comprises a set of glint objects corresponding to the auto-reflected light and a set of kinetic objects, and to process each extracted object to determine if the extracted object is a foreign object in the field of view compared to a known background determined from a series of previous image frames, wherein determining the set of glint objects is not a function of determining the set of kinetic objects, and determining the set of kinetic objects is not a function of determining the set of glint objects.

2. The apparatus of claim 1 further comprising means for adapting an exposure of the camera according to changing time of day and other lighting conditions, thereby normalizing pixels from image frame to image frame.

3. The apparatus of claim 1 further comprising means for calibrating one or more known object locations in the known background, each of the one or more known object locations correspond to a known glint object when illuminated by the illumination source, and means for determining an ON/OFF state of the illumination source by determining if the known glint object is present at each of the one or more known object locations when the illumination source is ON.

4. The apparatus of claim 1 wherein the foreign object is an observer and the means for processing is configured to detect the observer in the field of view looking in the direction of the camera.

5. The apparatus of claim 1 wherein the foreign object is an observer looking through an optical device and the means for processing is configured to detect the observer in the field of view looking through the optical device in the direction of the camera.

6. An apparatus comprising:
   a. an illumination source configured to illuminate a field of view;
   b. a camera configured to capture a series of image frames corresponding to the field of view, wherein each image frame includes auto-reflected light from within the field of view resulting from illumination by the illumination source;
   c. a memory configured to store the series of image frames; and
   d. a processor coupled to the memory, the processor comprises program instructions configured to:
      i. determine a known background, wherein the known background comprises a known value for each pixel in the field of view;
      ii. determine a difference between a current image frame and the known background thereby forming a difference frame;
      iii. determine a set of extracted objects from the difference frame, wherein the set of extracted objects comprises a set of glint objects and a set of kinetic objects, further wherein determining the set of glint objects is performed independently of and is not a function of determining the set of kinetic objects; and
      iv. process each extracted object to determine if the extracted object is a foreign object within the field of view.

7. The apparatus of claim 6 wherein determining the set of glint objects comprises determining pixels from the difference frame that exceed a light intensity threshold, dilating an area surrounding each pixel exceeding the light intensity threshold to include other pixels in the area exceeding the light intensity threshold to form one or more groupings of pixels exceeding the light intensity threshold, and eroding each grouping to remove outlier pixels, whereby each eroded grouping forms a glint object.

8. The apparatus of claim 6 wherein processing each extracted object comprises processing each glint object by pattern matching each glint object to a known pattern database and assigning a first solution metric to the glint object based on a closeness of the pattern matching, wherein if the first solution metric exceeds a first threshold value then the glint object is determined to be a foreign object.

9. The apparatus of claim 8 wherein processing each glint object further comprises comparing a location of the glint object to a location of each of the set of kinetic objects and if the location of the glint object matches the location of one of the kinetic object then the glint object is determined to be a foreign object.

10. The apparatus of claim 8 wherein processing each glint object further comprises comparing a location of the glint object to a location of each of the set of kinetic objects and assigning a second solution metric to the glint object according to the comparison.

11. The apparatus of claim 10 wherein processing each glint object further comprises comparing the glint object to a persistent object list and assigning a third solution metric to the glint object according to the comparison, wherein the persistent object list comprises a list of extracted objects identified in previous image frames.

12. The apparatus of claim 11 wherein if the third solution metric exceeds a third solution metric threshold value then the glint object is determined to be a foreign object.

13. The apparatus of claim 11 wherein the first solution metric, the second solution metric, and the third solution metric are individually weighted and summed together to form a cumulative solution metric, wherein if the cumulative solution metric exceeds a cumulative solution metric threshold value then the glint object is determined to be a foreign object.

14. The apparatus of claim 6 wherein the set of kinetic objects comprise a set of kinetic ON objects corresponding to kinetic objects determined from the image frame captured when the illumination source is ON or a set of kinetic OFF objects corresponding to kinetic objects determined from the image frame when the illumination source is OFF.

15. The apparatus of claim 6 wherein the program instructions are further configured to trigger an alarm in response to determining that the extracted object is a foreign object.

16. The apparatus of claim 6 wherein the illumination source and the camera are co-aligned.

17. The apparatus of claim 6 wherein the illumination source comprises a laser.

18. The apparatus of claim 6 wherein the camera includes a filter to selectively capture predefined light wavelengths.

19. The apparatus of claim 18 wherein the illumination source is configured to emit light having the predefined wavelengths.

20. The apparatus of claim 6 wherein the known background comprises a first known background corresponding to when the illumination source is ON and a second known background corresponding to when the illumination source is OFF.

21. The apparatus of claim 20 wherein each image frame is associated with the illumination source ON or OFF, and the set of extracted objects are determined by determining the difference between the current frame corresponding to the illumination source ON and the first known background, or by determining the difference between the current frame corresponding to the illumination source OFF and the second known background.

22. The apparatus of claim 6 further comprising means for adapting an exposure of the camera according to changing time of day and other lighting conditions, thereby normalizing pixels from image frame to image frame.

23. The apparatus of claim 6 further comprising means for calibrating one or more known object locations in the known background, each of the one or more known object locations correspond to a known glint object when illuminated by the illumination source, and means for determining an ON/OFF state of the illumination source by determining if the known glint object is present at each of the one or more known object locations when the illumination source is ON.

24. The apparatus of claim 6 wherein the program instructions are further configured to detect an observer in the field of view looking in the direction of the camera.

25. The apparatus of claim 6 wherein the program instructions are further configured to detect an observer in the field of view looking through an optical device in the direction of the camera.

26. The apparatus of claim 6 wherein the set of glint objects are determined using the auto-reflected light.

27. The apparatus of claim 6 wherein the illumination source is configured to repeatedly turn ON and OFF to illuminate or not illuminate the field of view, and the series of image frames captured by the camera includes first image frames corresponding to image frames captured when the illumination source is ON and second image frames corresponding to image frames captured when the illumination source is OFF, further wherein determining a known background comprises determining a first known background frame and a second known background frame, wherein the first known background frame comprises a known value for each pixel in the filed of view when the illumination source is ON and the second known background frame comprises a known value for each pixel in the field of view when the illumination source is OFF, further wherein forming the difference frame comprises forming a first difference frame and a second difference frame, wherein the first difference frame is a difference between a current image frame captured when the illumination source is ON and the first known background frame, and the second difference frame is a difference between a current image frame captured when the illumination source is OFF and the second known background frame, further wherein determining the set of extracted objects from the difference frame comprises determining a set of extracted objects from the first difference frame and determining a set of extracted objects from the second difference frame, wherein the set of extracted objects from the first difference frame comprises a set of glint objects and a set of kinetic objects from the first difference frame, and the set of extracted objects from the second difference frame comprises a set of kinetic objects from the second difference frame, further wherein each glint object from the set of glint objects determined from the first difference frame is compared to a collection of known optical targets and a degree of matching is quantified as a first solution metric, if the first solution metric is greater than a first threshold value then the glint object is determined to be a foreign object in the field of view, further wherein the glint object is compared for spatial overlap with each kinetic object from the set of kinetic objects determined from the first difference frame and a degree of overlap is quantified as a second solution metric, if the first solution metric plus the second solution metric is greater than a second threshold value then the glint object is determined to be a foreign object in the field of view, further wherein each kinetic object from the set of kinetic objects determined from the first difference frame is compared is compared for spatial overlap with each kinetic object from the set of kinetic objects determined from the second difference frame of an immediately preceding image frame and a degree of overlap is quantified as a third solution metric, if the first solution metric plus the second solution metric plus the third solution metric is greater than a third threshold value then the kinetic object from the first difference frame is determined to be a foreign object in the field of view.

* * * * *